United States Patent [19]
Schultz et al.

[11] Patent Number: 6,043,613
[45] Date of Patent: Mar. 28, 2000

[54] STARTING SYSTEM FOR ELECTRODELESS METAL HALIDE DISCHARGE LAMPS

[75] Inventors: William Newell Schultz, Niskayuna; Robert James Thomas, Rexford, both of N.Y.

[73] Assignee: General Electric Company, Schenectady, N.Y.

[21] Appl. No.: 09/140,100

[22] Filed: Aug. 26, 1998

[51] Int. Cl.[7] .................................................. H05B 37/02
[52] U.S. Cl. ......................... 315/248; 315/267; 315/338; 315/344
[58] Field of Search .................... 315/248, 344, 315/338, 267

[56] References Cited

U.S. PATENT DOCUMENTS

| | | | |
|---|---|---|---|
| 4,783,615 | 11/1988 | Dakin | 315/248 |
| 4,810,938 | 3/1989 | Johnson et al. | 315/248 |
| 4,812,702 | 3/1989 | Anderson | 313/153 |
| 4,972,120 | 11/1990 | Witting | 313/638 |
| 5,039,903 | 8/1991 | Farrall | 313/160 |
| 5,047,692 | 9/1991 | Borowiec et al. | 315/248 |
| 5,075,600 | 12/1991 | El-Hamamsy et al. | 315/248 |
| 5,103,140 | 4/1992 | Cocoma et al. | 315/248 |
| 5,107,185 | 4/1992 | El-Hamamsy et al. | 315/248 |
| 5,118,997 | 6/1992 | El-Hamamsy | 315/248 |
| 5,175,476 | 12/1992 | Anderson et al. | 315/248 |
| 5,214,357 | 5/1993 | Dakin et al. | 315/248 |
| 5,331,120 | 7/1994 | Fleischer | 181/207 |
| 5,331,254 | 7/1994 | Cocoma et al. | 315/248 |
| 5,332,970 | 7/1994 | El-Hamamsy et al. | 324/414 |
| 5,382,878 | 1/1995 | Secen et al. | 315/248 |
| 5,463,285 | 10/1995 | El-Hamamsy | 315/248 |
| 5,479,102 | 12/1995 | El-Hamamsy et al. | 324/414 |
| 5,600,187 | 2/1997 | El-Hamamsy et al. | 307/157 |

*Primary Examiner*—David H. Vu
*Attorney, Agent, or Firm*—Jill M. Breedlove; Douglas E. Stoner

[57] ABSTRACT

A starting system for an electrodeless metal halide discharge lamp includes a parallel tuned LC network including a fixed capacitor and a starting inductor, and also including a conductive plate for application to the starting inductor for detuning the network once the lamp has started. The detuned starting network produces insufficient voltage to maintain the starting plasma while the lamp is running. The conductive plate is removed from the starting inductor by a solenoid or other mechanical actuator during lamp starting.

4 Claims, 2 Drawing Sheets

STARTING SYSTEM FOR ELECTRODELESS METAL HALIDE DISCHARGE LAMPS

BACKGROUND OF THE INVENTION

The present invention relates generally to electrodeless metal halide discharge lamps and, more particularly, to a starting system therefor.

In an electrodeless metal halide lamp, an arc discharge is generated by establishing a solenoidal electric field in a gas contained within an arc tube. The solenoidal electric field is created by the time-varying magnetic field of an excitation coil which is disposed about the arc tube. The arc tube and excitation coil assembly acts essentially as a transformer which couples RF energy to the plasma.

In effect, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. Hence, a starting system is required. Electrodeless metal halide lamps can be started using a passive resonant circuit which provides the high voltage necessary to initiate the plasma in a starting tube. One approach is to use a parallel LC network with an adjustable capacitor for tuning the starting circuit to resonance. Presently available starting networks are manually operated and must be removed completely when the lamp starts. Otherwise, if the starting network is left in place after starting, a plasma would be maintained in the starting tube, and the lamp envelope between the starting tube and the main lamp cavity would be damaged in a short time, e.g., within a few hours of operation. Requiring that the starting network be manually removed limits the use of these lamps to applications where the network is accessible.

Accordingly, it is desirable to provide a tuned starting circuit which does not require manual operation and removal after starting.

SUMMARY OF THE INVENTION

A starting circuit for an electrodeless metal halide discharge lamp comprises a parallel tuned LC network comprising a fixed capacitor and a starting inductor, and further comprising a conductive plate for application to the starting inductor for detuning the network once the lamp has started. The detuned starting network produces insufficient voltage to maintain the starting plasma. Consequently, the starting plasma extinguishes after starting such that the lamp envelope is protected from erosion which would otherwise result from maintenance of the starting plasma while the lamp is running. The conductive plate is removed from the starting inductor by a solenoid or other mechanical actuator during lamp starting.

DETAILED DESCRIPTION OF THE INVENTION

Figure 1:
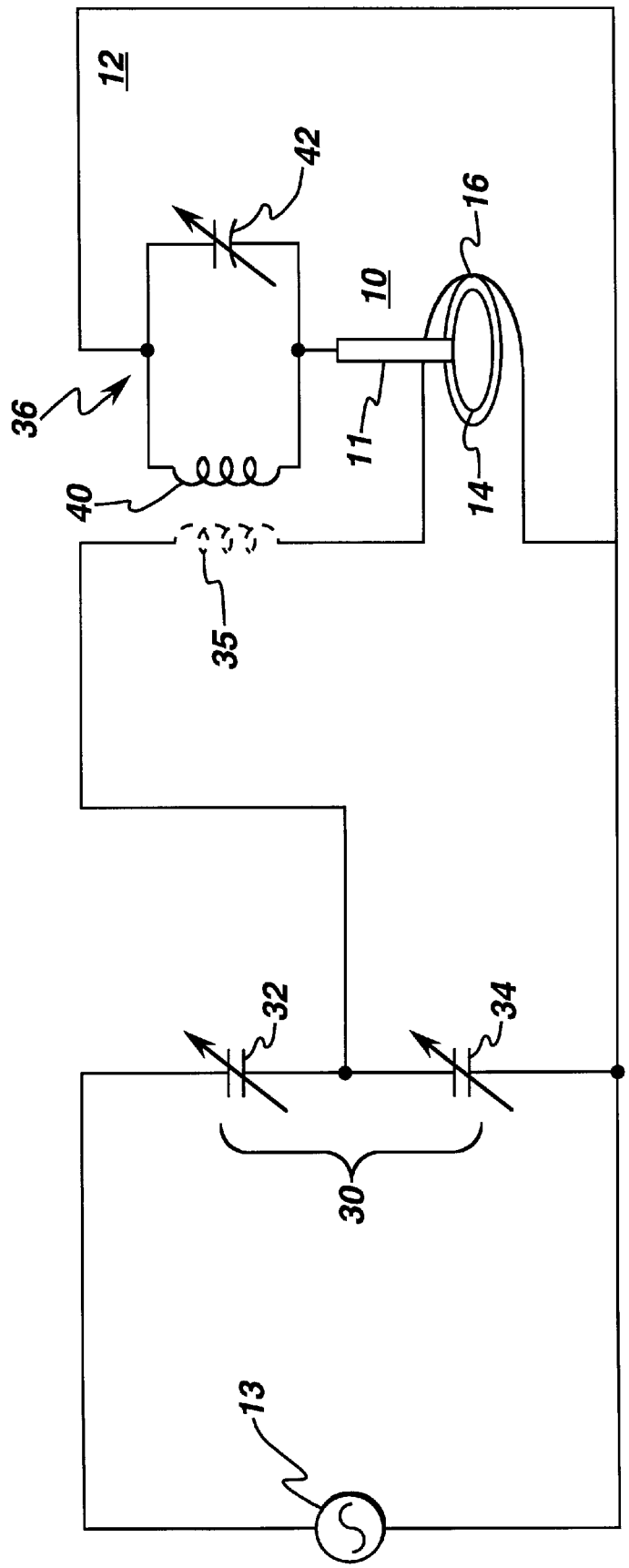
FIG. 1 schematically illustrates a ballast for an electrodeless high intensity discharge lamp including a starting network according to preferred embodiments of the present invention.

FIG. 1 is a schematic diagram of an electrodeless metal halide lamp 10 and associated ballast 12, such as those described in U.S. Pat. No. 5,047,692 of J. C. Borowiec and S-A El-Hamamsy. A typical metal halide lamp includes a main arc tube, or chamber, 14 formed of a high temperature glass, such as fused quartz, or an optically transparent ceramic, such as polycrystalline alumina.

Main arc tube 14 contains a fill in which a solenoidal arc discharge is excited during lamp operation. A suitable fill, described in commonly assigned U.S. Pat. No. 4,810,938 of P. D. Johnson, J. T. Dakin and J. M. Anderson, issued on Mar. 7, 1989, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 Torr. Another suitable fill, described in commonly assigned U.S. Pat. No. 4,972,120 of H. L. Witting, issued Nov. 20, 1990, comprises a combination of a lanthanum halide, a sodium halide, a cerium halide and xenon or krypton as a buffer gas.

Electrical power is applied to the metal halide lamp by an excitation, or drive, coil 16 disposed about main arc tube 14 which is driven by an RF signal 13 via ballast 12. A suitable excitation coil 16 may comprise, for example, a two-turn coil having a configuration such as that described in commonly assigned U.S. Pat. No. 5,039,903 of G. A. Farrall, issued Aug. 13, 1991. Such a coil configuration results in very high efficiency and causes only minimal blockage of light from the lamp. The overall shape of the excitation coil of the Farrall patent is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989. In particular, the Anderson patent describes a coil having six turns which are arranged to have a substantially V-shaped cross section on each side of a coil center line. Still another suitable excitation coil may be of solenoidal shape, for example.

During normal lamp running operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge in arc tube 14. The operation of an exemplary electrodeless metal halide lamp is described in commonly assigned Dakin U.S. Pat. No. 4,783,615.

Before normal running operation can be achieved, however, as explained hereinabove, a starting system is required to provide a relatively high voltage for initiating a starting plasma. The electric field produced by the excitation coil is sufficient to maintain the arc in the main arc chamber, but is not intense enough to initiate the arc when starting the lamp. To aid in lamp starting, a starting tube 11 is attached to the outside of main arc 14. The starting tube typically contains a noble gas fill at a pressure of about 20 Torr. A large electric field is applied along this tube by the starting system. The large electric field and low fill pressure combine to initiate a plasma discharge in the starting tube. This discharge helps to ionize the gas in the main arc chamber, lighting the lamp.

Once the main arc is established, the starting plasma must be extinguished. Otherwise, whisker-like discharges would emanate from the interface between the starting tube and the main arc tube and would overheat the quartz wall of the main arc tube, causing it to fail.

As illustrated in the embodiment of FIG. 1, a starting system is provided which comprises a starting circuit, including a starting capacitance and a starting inductance, and also including a mechanical detuner which detunes the starting circuit once the lamp has started, i.e., upon initiation of the main arc discharge.

As illustrated in FIG. 1, metal halide lamp ballast 12 comprises a power supply 13, such as, for example, a Class-D or a Class E power amplifier. A resonant load network is connected across the power supply. The resonant load network comprises a tuning capacitance 30, illustrated in FIG. 1 as comprising a pair of series-connected tuning capacitors 32 and 34.

Schematically, excitation coil 16 is shown in FIG. 1 connected in series with a "phantom" primary winding 35 of a transformer. The phantom primary actually comprises the stray electric fields which exist in the vicinity of the excitation coil. These stray fields couple into a starting coil 40. The starting coil 40 and a starting capacitor 42 comprise a parallel resonant network that is tuned to the operating frequency of the driving source 13. The starting capacitor is used for resonant circuit tuning. The currents induced in the starting coil generate large voltages at the terminals of the starting network. As shown in FIG. 1, this voltage is applied across the starting tube and generates the starting plasma therein.

Figure 2:
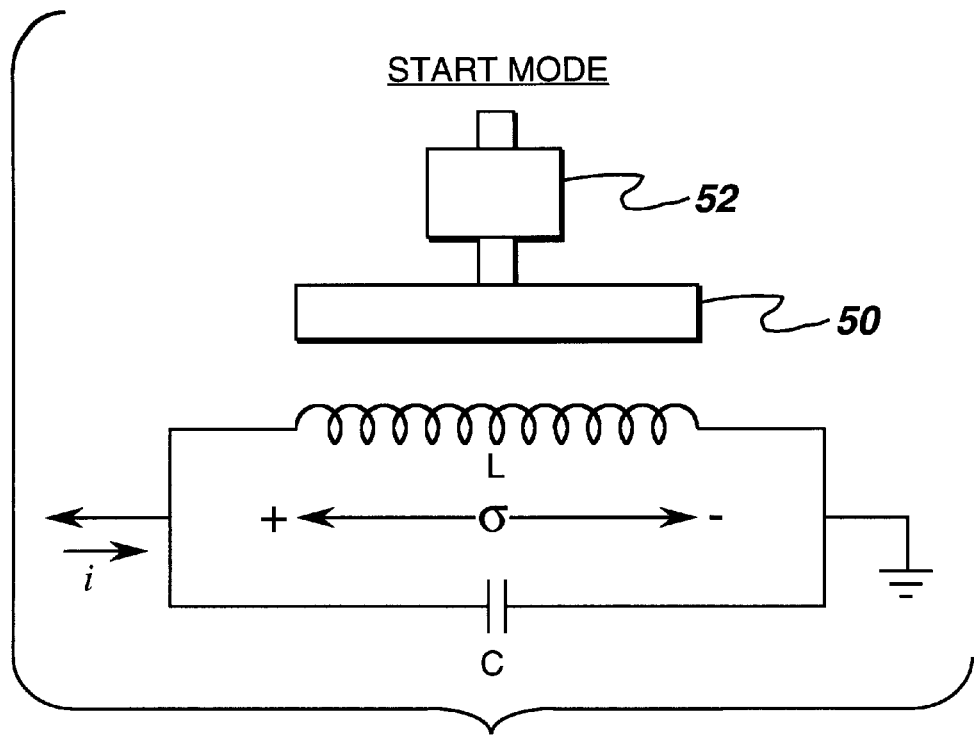
FIG. 2 schematically illustrates a starting network during the lamp starting mode according to a preferred embodiment of the present invention.
Figure 3:
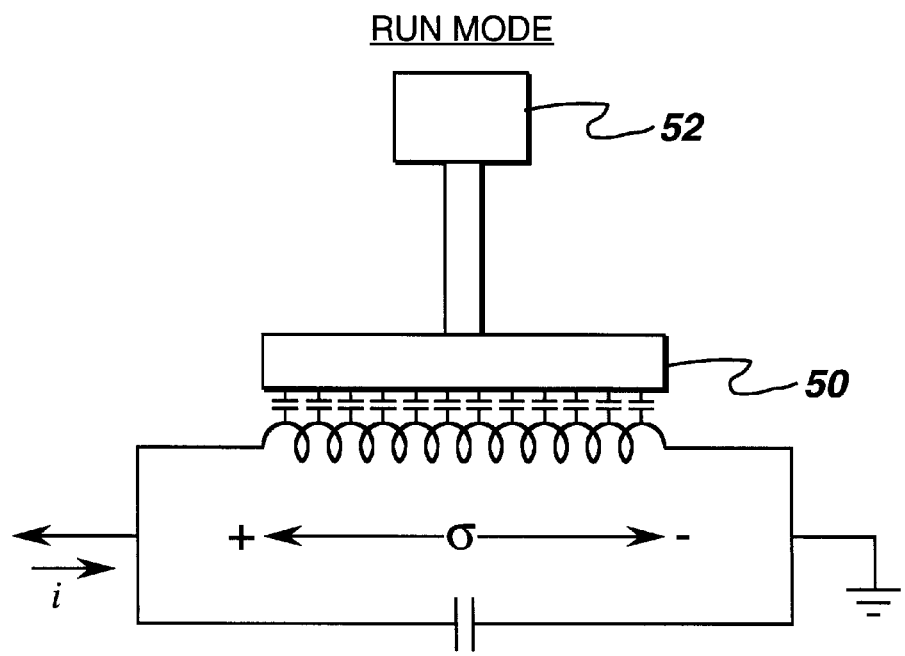
FIG. 3 schematically illustrates a starting network during the lamp running mode according to a preferred embodiment of the present invention.

The starting system also includes a movable conductive element 50, illustrated in FIGS. 2 and 3 as comprising a conductive plate. In particular, FIG. 2 illustrates the starting network during lamp starting with conductive plate 50 positioned at a sufficient distance from the parallel LC network such that small currents i generate sufficiently large voltages v to initiate a starting plasma. Once the starting plasma has been initiated, a solenoid or other mechanical actuator 52 moves the conductive plate sufficiently close to the starting inductor to detune the starting circuit and thereby effectively remove the starting network from the ballast. The detuned starting network cannot generate sufficient voltage to maintain the starting plasma. As a result, the starting plasma extinguishes, and the lamp envelope is protected from erosion which would otherwise occur if the starting plasma were maintained while the lamp is running.

Advantageously, the starting system and method described hereinabove do not require movement of any of the tuned starting components, such that the critical tuning for starting is maintained. Furthermore, avoiding the necessity of moving tuned components is particularly advantageous since parasitic capacitance is a significant portion of the starting capacitance; that is, moving a lead to physically disconnect the starting circuit would require very precise repositioning during reconnection of the lead to again achieve resonant operation. The detuning technique described herein requires only that the conductive plate be moved far enough from the coil during starting such that resonance is restored, and that it be close enough during running to detune the starting network. The precise location of the plate is not otherwise critical.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for starting an electrodeless discharge lamp of the type having a main arc tube and an excitation coil for exciting a main arc discharge in an ionizable fill contained in the main arc tube when excited by a radio frequency ballast, the main arc tube being coupled to a starting tube in which a starting plasma is initiated to start the lamp, the steps of the method comprising:

providing a tuned starting circuit comprising starting circuit components including a starting inductance and a starting capacitance;

initiating a starting plasma in the starting tube by exciting the radio frequency ballast; and detuning the starting circuit using a mechanical detuner without requiring movement of the starting inductance or starting capacitance or leads thereto, the mechanical detuner comprising a conductive element, the detuning step comprising positioning the conductive element sufficiently close to the starting inductance upon lamp starting such that the starting circuit is detuned and the starting plasma is extinguished after initiation of the main arc discharge.

2. The method of claim 1 wherein the detuning step further comprises using a mechanical actuator to position the conductive element.

3. A starting system for starting an electrodeless discharge lamp of the type having a main arc tube and an excitation coil for exciting an arc discharge in an ionizable fill contained in the main arc tube when excited by a radio frequency ballast, the main arc tube being coupled to a starting tube in which a starting plasma is initiated to start the lamp, comprising:

a tuned starting circuit comprising starting circuit components including a starting inductance and a starting capacitance, the tuned starting circuit generating a starting plasma in the starting tube upon excitation by the radio frequency ballast; and a mechanical detuner for detuning the starting circuit and extinguishing the starting plasma after initiation of the main arc discharge without requiring movement of the starting inductance or starting capacitance or leads thereto, the mechanical detuner comprising a conductive element, the conductive element being positioned sufficiently far from the starting inductance to maintain the starting circuit in tune during lamp starting, and being positioned sufficiently close to the starting inductance upon lamp starting such that the starting circuit is detuned and the starting plasma is extinguished after initiation of the main arc discharge.

4. The starting system of claim 3 wherein the mechanical detuner further comprises a mechanical actuator for positioning the conductive element.

* * * * *